E. THOMSON.
METHOD OF ELECTRIC WELDING.
APPLICATION FILED NOV. 6, 1917.
1,273,203.
Patented July 23, 1918.
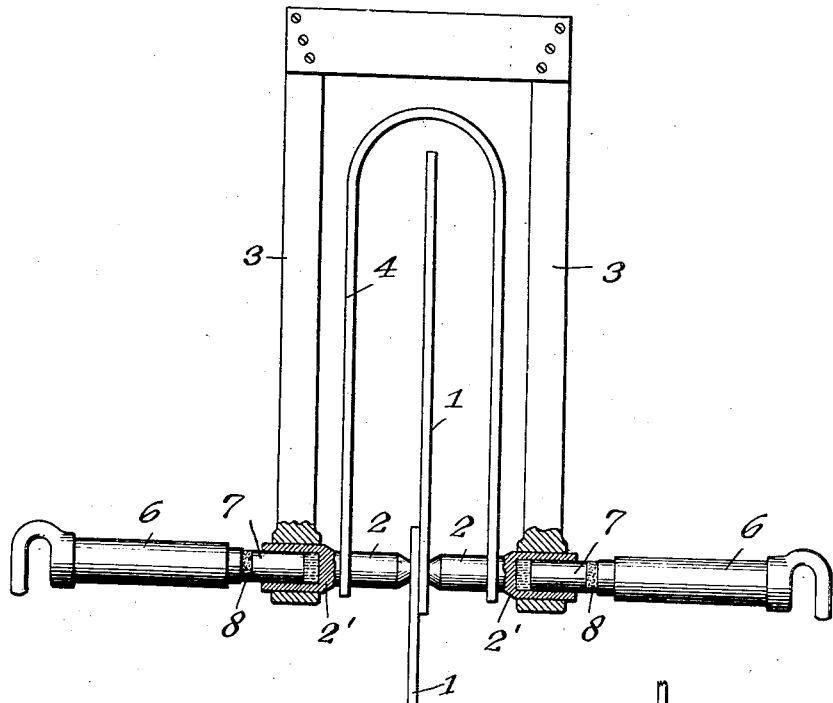
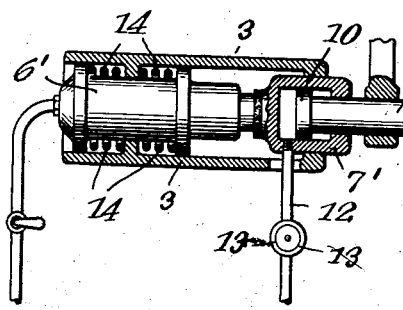
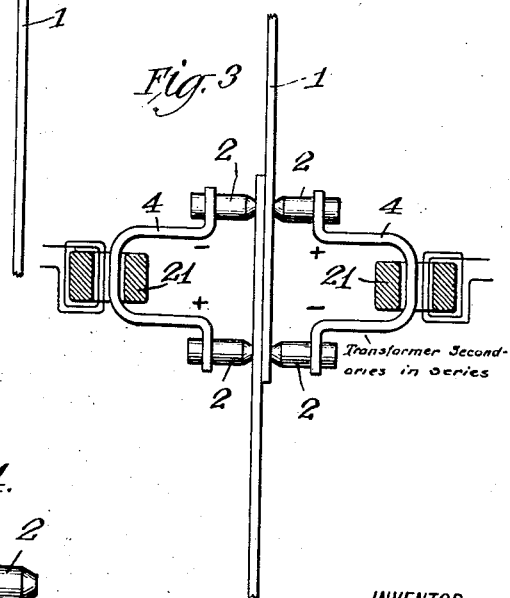
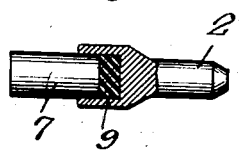
INVENTOR
Elihu Thomson
BY
Townsend & Decker
ATTORNEYS

UNITED STATES PATENT OFFICE.

ELIHU THOMSON, OF SWAMPSCOTT, MASSACHUSETTS, ASSIGNOR TO THOMSON SPOT WELDER COMPANY, OF BOSTON, MASSACHUSETTS, A CORPORATION OF MASSACHUSETTS.

METHOD OF ELECTRIC WELDING.

1,273,203.  Specification of Letters Patent.  Patented July 23, 1918.

Application filed November 6, 1917. Serial No. 200,485.

*To all whom it may concern:*

Be it known that I, ELIHU THOMSON, a citizen of the United States, and a resident of Swampscott, in the county of Essex and State of Massachusetts, have invented certain new and useful Improvements in Methods of Electric Welding, of which the following is a specification.

My invention relates to those processes of electric metal working wherein the heated work or section of work heated by electricity or otherwise is subjected to the action of a welding, riveting or forging tool engaging therewith, said tool being preferably an electrode by which the current is conveyed through the metal section to be heated for the purpose of bringing it to the required temperature for the welding, riveting or forging operation.
In these operations as ordinarily conducted the tool which engages the heated section of the work is forced against the same by devices acting by a continually applied power and mounted usually upon a suitable rigid frame or support made sufficiently rigid to re-act against said devices to permit the desired pressure to be exerted. Well known examples of this are electric riveting as heretofore conducted in the art and electric welding wherein two pieces of metal are interposed between current bearing and pressure applying electrodes making contact with the heated portion of the work as for instance in spot welding.
The object of my present invention is to cause the tool to be forced by practically continuous or steady pressure against the work by the application of an intermittently acting power, as for instance the power of a pneumatic hammer.

To this end my invention consists essentially in forcing the tool against the heated section of the work by applying the intermittently acting power to the tool through the intervention of a body having considerable inertia, the latter being elastically connected to the tool by any suitable means as will hereinafter be more particularly described.
The invention further consists in combinations of devices or apparatus to be more particularly specified in the claims.

My invention may be practised by the use of various forms of apparatus, some of the forms of which in their essential parts are shown in the accompanying drawings as employed in the work of welding two vertically disposed plates together at their lapped portions or surfaces in engagement.

In the accompanying drawings:
Figure 1 is a side elevation of a form of apparatus illustrating my invention, the parts being shown in vertical section.

Fig. 2 shows in vertical section the essential parts of the device in a preferred form.

Fig. 3 shows a modification in the disposition of the parts supplying the welding current to avoid the necessity of carrying the welding current around the edge of the sheets to be welded.

Fig. 4 illustrates a modification in a detail of the parts through which the intermittently acting power of the blows of the hammer are transferred into a steady pressure in the tool.

Referring to Fig. 1 of the drawings, 1 indicates the two plates which are to be welded together and 2 indicates a pair of electrodes by means of which current is passed through the lapped portion of the plates 1 to heat the same, said electrodes being employed also as the welding tools after the heating has progressed to the desired point.

3 indicates any frame or support adapted to hold the electrodes in suspension and in alinement with one another while at the same time permitting them to move against the work. Said electrodes are connected to or form terminals of a suitable source of heating current typified in the drawings as a secondary 4 of a transformer, the attachment being such that, as well understood in the art, the movement of the electrodes will not be interfered with. The base or body portion of the electrodes indicated at 2' is suitably mounted in the frame 3 to be capable of movement against the work or, as will be obvious, the terminal portion of the frame might be made flexible or jointed to allow such movement.

The base 2' of the electrodes carries plunger 7 mounted in a cylindrical cavity in said base and adapted to receive upon its outer end the blows of any pneumatic or other power hammer whose work-engaging ends may be brought into engagement with said plunger or body 7. The hammer may be held by hand or is preferably, as hereinafter described, suitably mounted on the frame of the apparatus. Said plunger 7 acts practically as an anvil to receive the blows of the hammer and should be of very considerable mass so that it will have sufficient inertia to prevent it from springing back quickly in the intermissions between the blows of the hammer. Between said anvil and the tool a suitable cushion or elastic medium or material is interposed through which the anvil, when subjected to the blows of the hammer, exerts the pressure upon the tool. Such elastic medium might be a spring or a body of elastic material or might be, as indicated in Fig. 1, a body of some compressible or elastic fluid like air interposed between the inner end of the plunger and the bottom of the cylindrical cavity in the base 2' in which the plunger works.

As indicated in Fig. 4, instead of the air, a block of rubber or other elastic material 9 or even a metallic spring might be employed between the anvil and the tool.

The repeated blows of the hammer upon the anvil or body 7 are translated through the elastic medium between the tool and the hammer into a practically steady pressure on the tool and the work to which it is applied. It is essential, as will be readily understood, that the part 7 should have a large inertia and, as will be seen, it operates practically as a heavy anvil which is driven ahead by the blows and on account of its high inertia does not recoil or come back to any great degree before the next blow is delivered. As the stroke is extremely small it is obvious that the length of the cylindrical portion 2' and the space between the inner end of the anvil 7 and the tool 2 may be only just enough to give the cushioning or elastic effect. If the elastic effect is obtained by air, provision should be made for leakage as indicated in Fig. 2.

In the illustration of my invention shown in Fig. 1 the hammer is shown as an ordinary hand operated pneumatic hammer but in practice it is preferable to employ a special pneumatic hammer hung from the framework and as indicated in the Fig. 2. In this instance the base of the tool 2 consists of a piston 10 working freely in a body 7' formed as the cylinder for the piston and adapted to receive upon its rear end the blows of the pneumatic hammer 6'. In this case the anvil 7' acts upon the hammer, as before, through the elastic body of air interposed between the head 10 and the end of the body 7'. Air may be supplied through the pipe 12 and pressure regulator 13 adapted to regulate the amount of air pressure betwen the head of the piston and the cylinder or block 7', thereby compensating for leakage and likewise permitting the pressure to be regulated as desired. The hammer itself may be mounted in the frame 3, as shown in Fig. 2, said frame being extended to support and guide the body 7' as well as the cylinder of a pneumatic hammer. In this case it is desirable to mount the hammer cylinder elastically as between a pair of springs 14.

In the form in which my invention is shown as carried out in Fig. 1 the course of the heating current is around the edge of the work. In some cases this might require an undue or objectionable length of the circuit to avoid which a pair of electrodes could be used on each side with transformers working in series as illustrated diagrammatically in Fig. 3. This arrangement shortens the secondary and at the same time would permit two welds to be made at the same instant.

If desired, a facing of leather 8 or other cushioning body may be applied on the outer end of the anvil to receive the blows of the hammer.

In conducting the operation by the various appliances described the electrodes are aligned and brought into engagement with the work in the usual way, the electrodes or similar tools engaging the same being forced against it with a continuous or steady pressure by a succession of blows delivered upon the anvil or anvils by the automatic hammers and coming in such rapid succession that a practically steady pressure will be exerted on the work through the intermediary elastic medium or device.

As will be seen, my invention is particularly useful in effecting a union between two lapped metal plates as for instance ship plates arranged in vertical position, it being only necessary to bring the two floating or freely movable electrodes suspended on a light frame into alinement opposite the desired point of union and to subject them to the action of the automatic hammers delivering the rapid succession of blows upon them to force them against the work, the heating current being applied in the usual way.

What I claim as my invention is:—

1. The herein described improvement in electric metal working operations consisting in forcing a tool with a continuous or steady pressure against the work by the application of an intermittently acting percussive force acting on the tool through a body having considerable inertia and elastically connected to the tool.

2. The herein described improvement in electric metal working operations of the character set forth, consisting in alining the electrodes with the work interposed between them and forcing them against the work with a substantially steady pressure by the power of a succession of blows delivered upon a body having great inertia and connected to the electrode by an intermediate elastic body.

3. The herein described improvement in electric metal working operations of the character set forth, consisting in forcing the work-engaging electrode with a steady pressure against the work by the power of inertia of a body engaged with the electrode and the action of a pneumatic hammer applied to said body and delivering thereon a rapid succession of blows.

4. An apparatus for electric welding, riveting or similar operations, comprising a freely movable electrode, an anvil adapted to receive the blows of a hammer and an elastic medium disposed between the anvil and hammer.

5. In an apparatus of the character described, the combination of a work-engaging tool engaging the heated section of work, an anvil adapted to receive the blows of a pneumatic hammer and a cushion between said anvil and tool.

6. In an apparatus of the character described, the combination of a work-engaging tool engaging the heated section of work, an anvil adapted to receive the blows of a pneumatic hammer and an elastic body between said anvil and tool.

7. In an apparatus of the character described, the combination of a tool, an anvil and a hammer elastically mounted.

8. Means for obtaining practically steady pressure of a tool upon the work comprising an anvil, a tool mounted to be free to move independently of the anvil and a hammer adapted to deliver a rapid succession of blows upon said anvil.

Signed at Lynn, in the county of Essex and State of Massachusetts, this second day of November, A. D. 1917.

ELIHU THOMSON.

Witnesses:
F. B. TOWNSEND,
IRENE LEFKOWITZ.